June 12, 1928.  J. M. MAURER  1,673,467

VEHICLE MOUNTING

Filed Sept. 7, 1926   3 Sheets-Sheet 1

INVENTOR.
John M. Maurer
BY Townsend Loftus & Abbett
ATTORNEYS.

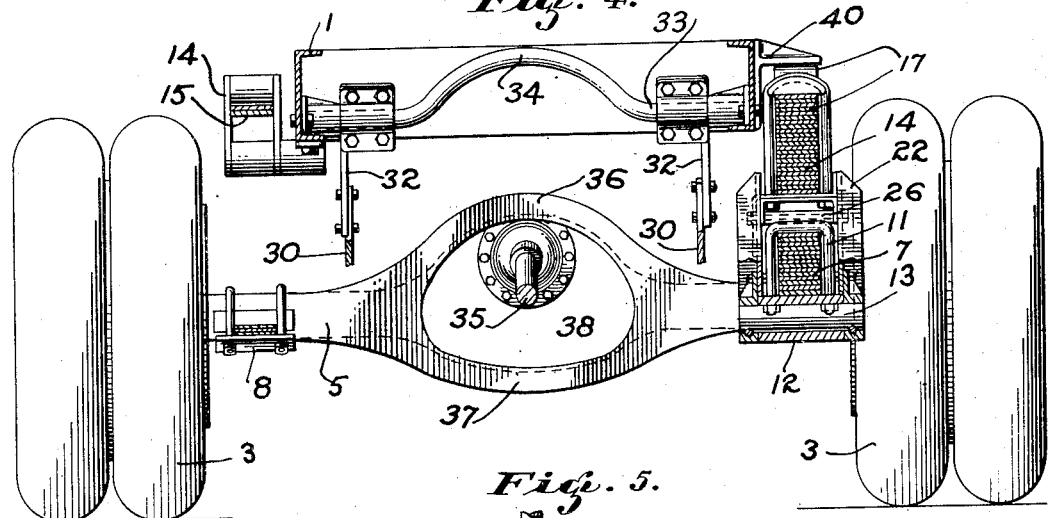
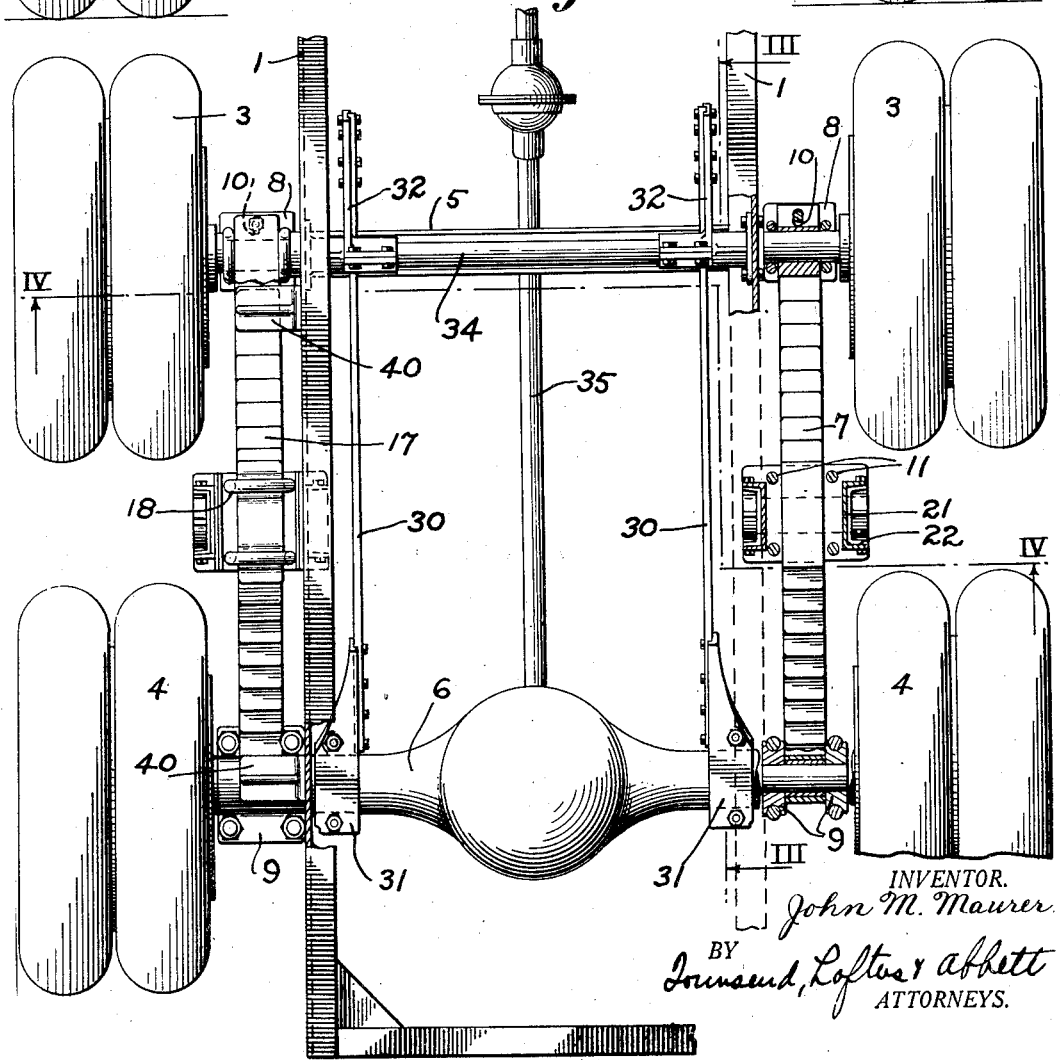

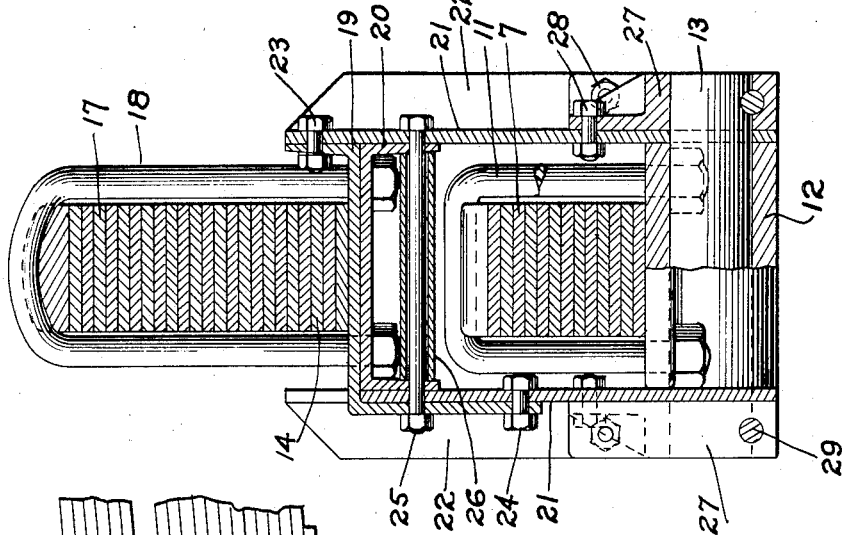
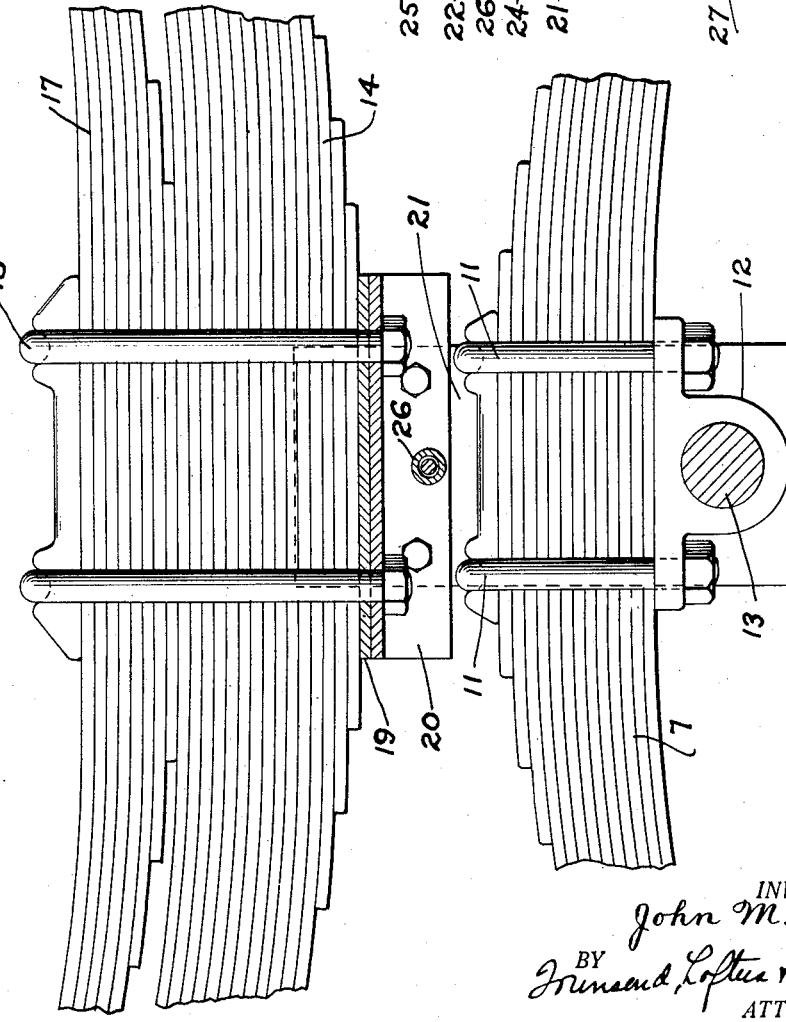

Patented June 12, 1928.

1,673,467

UNITED STATES PATENT OFFICE.

JOHN M. MAURER, OF OAKLAND, CALIFORNIA.

VEHICLE MOUNTING.

Application filed September 7, 1926. Serial No. 133,769.

This invention relates to vehicle mountings, and more especially to an improved flexible vehicle mounting for heavy freight carrying automobiles. In order to increase the load capacity, such vehicles have been made with a two-axle rear truck in place of the ordinary single rear axle. These two axles have heretofore been connected together and to the vehicle frame in rather a rigid manner, this being considered necessary in order to sustain the great loads carried. Such a connection prevents relative flexibility between the two axles and frame and thereby results in great wear on the tires, great jolting of the load and the necessity of lifting the load a considerable amount whenever the wheels pass over obstacles. It is the primary object of my invention to provide an improved flexible mounting which will eliminate these objections.

In my improved mounting, I connect the two rear truck axles with compound leaf springs above and co-operating with which are other leaf springs supporting the vehicle frame, and I connect these upper and lower springs with flexible steel plates which sustain the load and permit a slight relative twisting movement of the springs about a vertical axis extending through the spring connections. I furthermore mount the lower springs for pivotal movement about a horizontal axis extending transversely of the springs.

The flexible connection between the lower and upper springs permits relative movement between such springs when turning the vehicle, thereby permitting the wheels to gradually roll to their new position instead of sliding the wheels in a manner severely wearing the tires as is done with a rigid connection. The pivoting of the lower springs about a horizontal axis permits a vertical freedom in the frame and rear axles whereby the wheels can pass over obstacles and drop into depressions without appreciably affecting the frame and without having to lift the load. It is an object of my invention to provide a vehicle truck mounting embodying these improvements.

It is another object of my invention to so connect the driving axle with the frame that the axle will be held in its proper driving relation but permitted a twisting movement in a vertical direction. This object is accomplished by the use of a pair of flexible spring metal torque arms, hereinafter described which permit relative movement of the wheels vertically.

A further object of the invention resides in the provision of the front non-driving axle having its central portion arched above and below in a manner forming an opening through which the drive to the rear axle may extend. I have found that driving from the rear axle is advantageous in many respects to driving from the front axle, or both axles, and my improved construction of front axle permits such drive.

In the accompanying drawings, I have illustrated certain specific embodiments of my invention, but it will be understood that the invention can be otherwise embodied and that the drawings are not to be construed as defining or limiting the scope of the invention, the claims appended hereto being relied upon for that purpose.

Referring to the figures of the drawing:

Fig. 4 is a sectional view taken on line IV—IV of Fig. 5.

Fig. 5 is a sectional plan view of the truck.

Fig. 6 is an enlarged fragmentary side elevation of the leaf springs.

Fig. 7 is a cross-sectional view therethrough.

Figure 1:
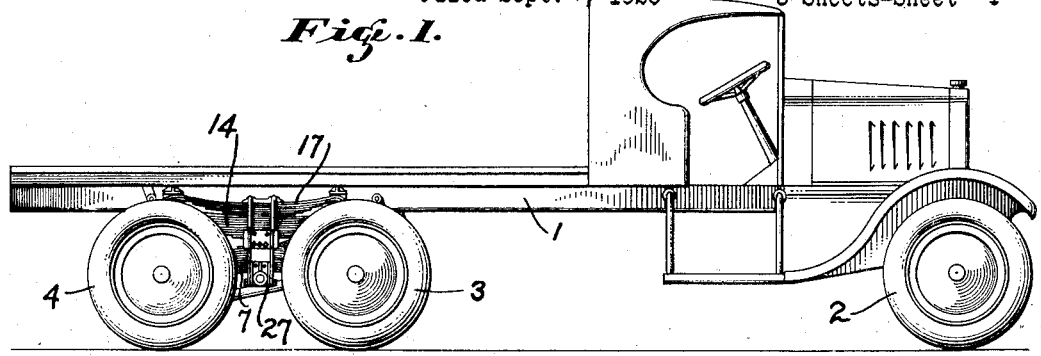
Fig. 1 is a side elevation of a heavy-duty vehicle embodying my invention.
Figure 2:
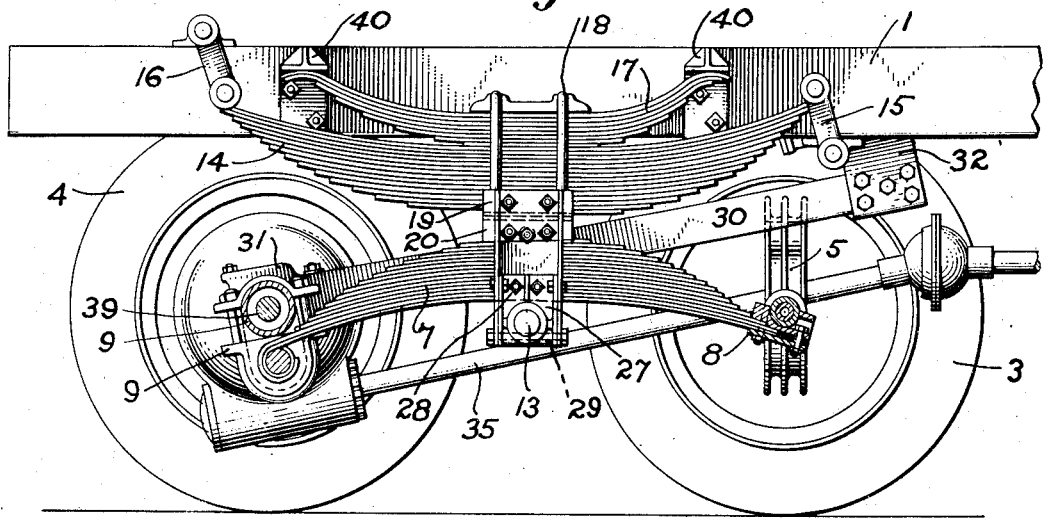
Fig. 2 is an enlarged inner side elevation of the rear truck thereof.
Figure 3:
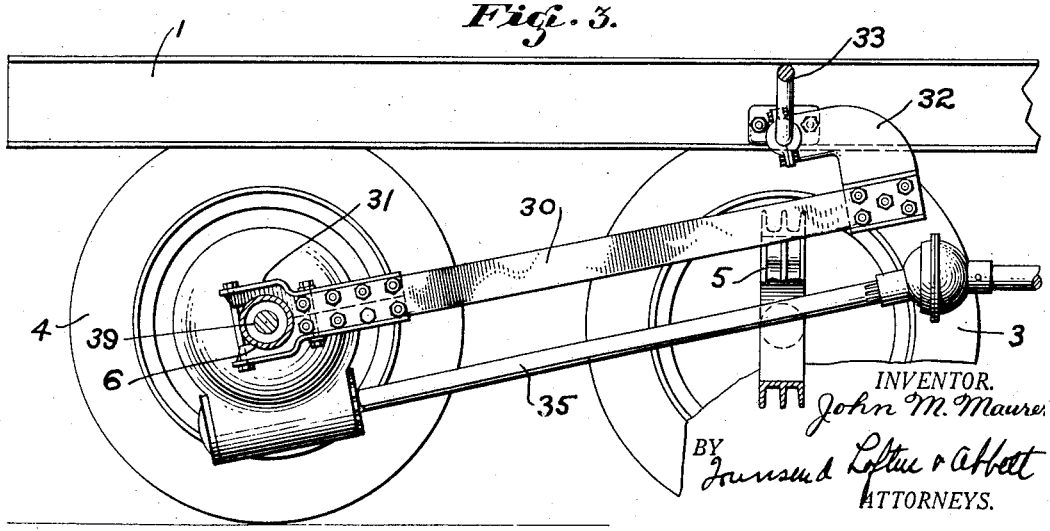
Fig. 3 is a side elevation taken on line III—III of Fig. 5.

In the drawings, 1 indicates the frame of a heavy freight carrying automobile supported on front wheels 2 and a truck carried by rear wheels 3 and 4. The novel features of my invention herein are embodied in this rear truck.

The rear truck comprises a front non-driving axle 5 and a rear driving axle 6. A pair of compound leaf springs 7 respectively connect the adjacent ends of the axles at opposite sides of the vehicle, the connection to the axles 5 and 6 being respectively by yokes 8 and 9, and the front ends of the springs being slotted at 10 to permit a slight longitudinal movement of the springs in the yokes 8.

Each spring 7 is held together by U-shaped clamping bolts 11 supporting a bearing plate 12 through which extends a shaft 13. A second pair of compound leaf springs 14 are respectively mounted directly above the spring 7 and the ends thereof are connected to the frame 1 by pivoted links 15 and 16. Each spring 14 and a third spring 17 combined therewith are held together by U-shaped clamping bolts 18 supporting plates 19 and 20 on the bottom thereof.

In their assembled position, the springs 7 and 14 are relatively spaced vertically and are held in such relation, in a manner flexibly supporting the load, by steel plates 21 located at opposite sides of the springs and connecting the shaft 13 to the plates 19 and 20. Each plate has a pair of vertically extending strengthening flanges 22. As best illustrated in Fig. 7, the plates 19 and 20 are provided with flanges at their ends which are secured to the plates 21 by bolts 23, 24 and 25. The bolt 25 is a through bolt and carries a spacing sleeve 26. This sleeve holds the plates 21 in spaced relation. The engagement of the plates 21 with the ends of the shaft 13 is reinforced by hub plates 27 engaging over such shaft ends and secured to the plates 21 and flanges 22 by bolts 28, pins 29 also being used to hold the hub plates to the shaft.

The rear axle 6 is held in its proper driving position by torque arms 30 consisting of flat metal steel strips secured to the axle at one end by yokes 31. The front ends of the strips are secured to angle plates 32 pivotally mounted on a rod 33 carried by the frame. The intermediate portion 34 of this rod is bowed upwardly for the purpose of clearing the axle 5 when the vehicle is loaded. The pivotal mounting of the strips permits free vertical movement of the rear axle and the flexibility of the strips permit the rear axle to have a limited lateral and vertical twisting movement.

In the vehicle illustrated the drive is to the rear axle, the front axle being merely for load support. In order to provide this latter axle of sufficient strength and yet permit a passing thereby of the drive shaft 35, I form the axle 5 in the manner illustrated. The intermediate portion thereof is arched over at 36 and under at 37 in a manner providing an opening 38 large enough to receive and permit a limited vertical movement to the drive shaft. This construction provides a very strong axle and one permitting drive to the rear axle shaft 39.

The springs 14 also have combined therewith the springs 17, the ends of which extend beneath lugs 40 on the frame. When the vehicle is empty, the lugs will ordinarily be raised off the springs 17. When the vehicle is loaded the depressed frame settles the lugs onto these springs which thereupon aid in supporting the load.

It is believed that the advantages of my invention will be obvious from the above description taken in connection with the drawings. Briefly stated, the purpose of my invention is to substitute flexibility for rigidity in the truck portion of a vehicle and especially in a vehicle designed for heavy duty. This flexibility of construction, in accordance with my invention, results in a vehicle mounting adapting the vehicle to run at a greatly increased speed and with a heavier load with far less wear to the mounting, its tires and the road, and with the jar and vibration present in the known trucks quite eliminated.

In the construction illustrated in the accompanying drawings, the load is supported on the rear truck entirely through the resilient plates 21 and on the horizontal pivot 13. When the vehicle makes a turn the wheels 3 and 4 are not immediately slid over to the new position, but, as the frame turns, the plates 21 twist in that direction and resiliently force the wheels 3 and 4 to the new position. In this manner the wheels are permitted to gradually roll to their new position rather than being slid thereto.

It is well known that in heavy vehicles of the two-rear-axle type, the rear truck tires wear out very quickly. I have built and had in operation for a considerable time a truck constructed in accordance with the disclosure herein. This truck has been in continuous use for many months past, and has carried an average load of 14 tons at a speed averaging better than 25 miles per hour. A set of "General" tires placed on the rear truck of this vehicle have run, under these conditions, for a distance exceeding 10,000 miles without a single blow-out and without showing any appreciable wear.

As stated above, the plates 21 permit a flexibility of the rear truck in a horizontal direction. The pivot 13 permits a flexibility of the truck axles 5 and 6 in a vertical direction. Should a wheel 3 or 4 drop into a depression or pass over an obstacle, the pivot at 13 permits such movement without appreciably affecting the load. I have, in actual practise, driven over deep depressions and high obstacles with a load without seriously jarring the load and without requiring an apprecible lifting of the load. This result obviously is of great advantage, particularly in carrying fragile loads or perishable loads such as fruit which will readily decay upon being severely bruised. Furthermore, this resilient mounting permitting a vertical movement of the wheels is a great saver of power, since obstacles, etc. may be passed over without having to lift the load.

Also the torque arms 30, being of flat metal permit a free relative twisting movement of the wheels 4 vertically. When passing over very uneven ground or when the wheels at one side are raised to an elevation far above the other side, these torque arms permit a free twisting which fully accommodates this condition.

I have furthermore found from actual practise that a load can be driven over heavy grades with far greater ease and efficiency when the drive is to the rear wheels 4 instead of to the front wheels 3. It has heretofore been difficult to drive to the rear axle because of the interference of the drive shaft with the front truck axle. The construction of my improved axle 5 permits free drive to the rear axle while keeping the front axle of the necessary strength for supporting the load.

When carrying a relatively small load, the same will be mostly carried on the springs 14, and when the truck is loaded heavily, or to capacity, the frame settled down onto the springs 17 which at this time aid in supporting the load.

It will be apparent from the disclosure herein that the great advantages and objects accomplished by my invention are due to the entirely flexible mounting of the rear truck. As illustrated, the parts are all secured in a manner fully supporting the load and holding the truck in load alignment while at the same time permitting a free flexibility thereof in every direction. As will be noted, the rear truck is supported on eight tires of large capacity, and these tires will support a tremendous load without placing an undue load on each tire or an undue strain on the road bed. The arrangement permits the carrying of extra heavy loads at high speeds with less wear on both the truck and load, and with a minimum amount of jar or vibration to the load.

Having thus described my invention, what I claim and desire to secure by Letters Patent is—

1. A vehicle mounting comprising in combination with a vehicle frame, a pair of supporting axles spaced apart, lower leaf springs located one at each side of the frame and connected at their ends to the adjacent axles, a pair of upper springs at each side of the frame above the lower springs, links connecting the ends of each of the lowermost springs of the upper pairs to the frame, lugs secured on the frame above the ends of the uppermost springs of the upper pairs and adapted to bear thereon when a load is imposed upon the frame, connecting means rigidly connecting the springs of each upper pair, bearing means rigidly suspended from said connecting means of each upper pair of springs and disposed at a point centrally below the adjacent lower spring, and a pivotal connection between each lower spring and the adjacent bearing means whereby said springs may pivot about a horizontal axis.

2. A vehicle mounting comprising in combination with a vehicle frame, a pair of supporting axles spaced apart, lower leaf springs located one at each side of the frame and connected at their ends to the adjacent axles, a pair of upper springs at each side of the frame above the lower springs, links connecting the ends of each of the lowermost springs of the upper pairs to the frame, lugs secured on the frame above the ends of the uppermost springs of the upper pairs and adapted to bear thereon when a load is imposed upon the frame, connecting means rigidly connecting the springs of each upper pair, bearing means rigidly suspended from said connecting means of each upper pair of springs and disposed at a point centrally below the adjacent lower spring, a pivotal connection between each lower spring and the adjacent bearing means whereby said springs may pivot about a horizontal axis, torque arms connected at one end to the rearmost axle and extending forwardly, said torque arms being located adjacent the sides of the frame, and pivotal connections between the forward ends of the torque arms and the frame.

JOHN M. MAURER.